(12) United States Patent
Tanikawa et al.

(10) Patent No.: US 10,132,415 B2
(45) Date of Patent: Nov. 20, 2018

(54) FLUID CONTROLLER

(71) Applicant: FUJIKIN INCORPORATED, Osaka-shi (JP)

(72) Inventors: Tsuyoshi Tanikawa, Osaka (JP); Michio Yamaji, Osaka (JP); Tadayuki Yakushijin, Osaka (JP); Keisuke Ishibashi, Osaka (JP); Yasumasa Yanagida, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 15/502,842

(22) PCT Filed: Dec. 14, 2015

(86) PCT No.: PCT/JP2015/084880
§ 371 (c)(1),
(2) Date: Feb. 9, 2017

(87) PCT Pub. No.: WO2016/104203
PCT Pub. Date: Jun. 30, 2016

(65) Prior Publication Data
US 2017/0234438 A1     Aug. 17, 2017

(30) Foreign Application Priority Data
Dec. 25, 2014   (JP) ................ 2014-262534

(51) Int. Cl.
*F16K 31/12*     (2006.01)
*F16K 1/52*      (2006.01)
(Continued)

(52) U.S. Cl.
CPC ............ *F16K 1/523* (2013.01); *F16K 31/122* (2013.01); *F16K 35/00* (2013.01)

(58) Field of Classification Search
CPC ....... F16K 1/523; F16K 31/508; F16K 31/122
(Continued)

(56) References Cited

U.S. PATENT DOCUMENTS 5,186,434 A * 2/1993 Nishimura ................ F16K 7/14
                                                251/331
5,188,338 A * 2/1993 Itoi ........................ F16K 31/506
                                                251/265

(Continued)

FOREIGN PATENT DOCUMENTS

JP     07-083338 A    3/1995
JP     3020501 U      2/1996
(Continued)

OTHER PUBLICATIONS

International Search Report dated Mar. 15, 2016, issued for PCT/JP2015/084880.

*Primary Examiner* — Matthew W Jellett
(74) *Attorney, Agent, or Firm* — Locke Lord LLP

(57) ABSTRACT

Provided is a fluid controller which enables precise flow-rate adjustment while securing the durability. The fluid controller includes a stem vertical-movement-amount upper-limit-value setting means 10 which sets an upper limit value of a vertical movement amount of a stem 8 associated with opening and closing operations. The fluid controller further includes a stem vertical-movement-amount fine-adjustment means 11 which changes the vertical movement amount of the stem 8 associated with the opening and closing operations, within a range of not greater than the upper limit value.

3 Claims, 4 Drawing Sheets

(51) Int. Cl.
  *F16K 31/122*  (2006.01)
  *F16K 35/00*  (2006.01)

(58) Field of Classification Search
  USPC .......... 251/63.5, 63.6, 92, 93, 266–271, 285
  See application file for complete search history.

(56) References Cited

U.S. PATENT DOCUMENTS

| | | | |
|---|---|---|---|
| 5,439,197 A | | 8/1995 | Itoi et al. |
| 6,691,737 B2* | | 2/2004 | Muller .................... F16K 1/523 |
| | | | 137/556 |
| 7,823,859 B2* | | 11/2010 | Ejiri .......................... F16K 7/14 |
| | | | 251/285 |
| 8,104,742 B2* | | 1/2012 | Ishihara ................ F16K 35/027 |
| | | | 251/265 |
| 8,141,582 B2* | | 3/2012 | Fukano .................... F16K 7/16 |
| | | | 116/277 |
| 8,256,744 B2* | | 9/2012 | Tanikawa ................... F16J 3/02 |
| | | | 251/331 |
| 2010/0090151 A1 | | 4/2010 | Tanikawa et al. |
| 2010/0320408 A1* | | 12/2010 | Nakata ................ F16K 31/1225 |
| | | | 251/205 |
| 2013/0142675 A1* | | 6/2013 | Nabei .................. F16K 31/046 |
| | | | 417/271 |

FOREIGN PATENT DOCUMENTS

| JP | 2000-283328 A | 10/2000 |
|---|---|---|
| JP | 2007-64333 A | 3/2007 |

\* cited by examiner

FLUID CONTROLLER

CROSS REFERENCE TO RELATED APPLICATIONS

This application is related to co-pending application: "FLUID CONTROLLER" filed even date herewith in the names of Yasumasa YANAGIDA; Michio YAMAJI; Tadayuki YAKUSHIJIN; Keisuke ISHIBASHI and Tsuyoshi TANIKAWA as a national phase entry of PCT/JP2015/084879, which application is assigned to the assignee of the present application and is incorporated by reference herein.

TECHNICAL FIELD

The present invention relates to fluid controllers and, in particular, to a fluid controller suitable to be used for continuously repeating opening and closing operations.

BACKGROUND ART

As a fluid controller which is used for continuously repeating opening and closing operations, one referred to as a direct touch-type diaphragm valve is known (Patent Literature 1).

Such a fluid controller is of an air driven type, is often used in a semiconductor manufacturing apparatus, and is required to be able to be used at high temperatures and to have a high durability. In addition, such fluid controllers are commonly used for a plurality of lines, and in this case the difference in flow rate (Cv value) among gas lines is required to be reduced.

Patent Literature 1 proposes setting of a vertical movement amount of a stem (diaphragm displacement amount) in association with opening and closing operations to a predetermined value in order to secure the durability (the number of continuous opening and closing operations).

CITATION LIST

Patent Literature

Patent Literature 1: Japanese Unexamined Patent

SUMMARY OF INVENTION

Technical Problem

Depending on the positions of valves for the gas lines, and on the individual differences among the valves, flow rates (Cv values) are slightly different from one another. In particular, in the case of the semiconductor manufacturing apparatus, the valve used at a location nearest to a chamber is to exert a direct influence on the semiconductor to be produced, depending on its Cv value. However, if the Cv values for the valves are individually adjusted according to the gas lines and the like, there is a possibility that a certain valve is adjusted to a movement amount greater than the stem vertical movement amount with which the durability of the valve is ensured. This may decrease the durability of the diaphragm (and valve). That is, there are cases where the durability is ensured and thereafter the flow rate adjustment becomes possible. When adjustment to adjustment amounts for the Cv values is performed using a single adjustment structure, it is impossible to confirm: to what extent the stem vertical movement amount is changed at the time of adjustment; and as to whether, as a result of the adjustment, it is not greater than the stem vertical movement amount with which the durability is ensured.

An object of the present invention is to provide a fluid controller which enables precise flow rate adjustment while securing the durability.

Solution to Problem

The fluid controller in accordance with the present invention is a fluid controller including: a body provided with a fluid channel; a bonnet provided above the body; a casing provided above the bonnet; a valve body which opens and closes the fluid channel; a stem which moves upward or downward to move the valve body in an open or close direction; and an actuator which causes the stem to move vertically, the fluid controller comprising a stem vertical-movement-amount upper-limit-value setting means which sets an upper limit value of a vertical movement amount of the stem associated with the opening and closing of the fluid channel, and a stem vertical-movement-amount fine-adjustment means which is capable of adjusting the vertical movement amount of the stem associated with the opening and closing of the fluid channel within a range of not greater than the upper limit value.

Since the upper limit value of the stem vertical movement amount may be adjusted by the stem vertical-movement-amount upper-limit-value setting means, fine adjustment of the stem vertical movement amount enables the movement amount to be prevented from being set beyond the upper limit within which the durability is ensured. Here, the stem vertical movement amount is adjusted whereby the Cv value is determined. As for the Cv value, fine adjustment needs to be performed. The fine adjustment is performed by the stem vertical-movement-amount fine-adjustment means which changes the value within a range of not greater than the upper limit value of the stem vertical movement amount which is set in advance. This fine adjustment enables the Cv value to be precisely set to a target value. When the Cv value changes in association with the use and there arises a need to adjust the Cv value, the stem vertical-movement-amount fine-adjustment means finely adjusts the stem vertical movement amount. Therefore, at the time of adjustment of the Cv value, the stem vertical movement amount is never set beyond the stem vertical movement amount upper limit value for ensuring the durability. With this configuration, it is possible to perform a flow rate adjustment precisely while ensuring the durability.

The upper limit value of the stem vertical movement amount is set by the stem vertical-movement-amount upper-limit-value setting means at the time of shipment of the fluid controller, and is maintained at the value set at the time of the shipment during use. The stem vertical movement amount is temporality set by the stem vertical-movement-amount fine-adjustment means at the time of shipment of the fluid controller, and is set to an appropriate value by a user during use.

The fluid controller is, for example, a metal diaphragm valve, but is not limited thereto. In addition, the fluid controller may be of a normally-close type or may be of a normally-open type.

It is preferable that the stem vertical-movement-amount fine-adjustment means has a movable body which is moved vertically by rotating a handle, the upper limit value of the stem vertical movement amount is obtained by changing a distance between the stem and the casing, and fine adjustment of the stem vertical movement amount is obtained by a change of a distance between an actuator drive shaft which is integral with the stem and the movable body.

With this configuration, adjustment by the stem vertical-movement-amount fine-adjustment means is facilitated.

It is preferable that an upper end portion of the actuator drive shaft which is integral with the stem is inserted into a shaft insertion hole of the movable body, a flange portion is provided on a part of the actuator drive shaft located below the shaft insertion hole, a distance between an upper surface of the flange portion of the actuator drive shaft and a lower surface of the movable body defines the stem vertical movement amount, and the stem vertical-movement-amount upper-limit-value setting means includes: a downward protruding portion of the casing, on which a male screw is formed; a female screw provided in a top wall of the bonnet; and a lock nut.

With this configuration, the stem vertical-movement-amount upper-limit-value setting means and stem vertical-movement-amount fine-adjustment means are both obtained with simple structure.

It is preferable that the stem vertical-movement-amount fine-adjustment means comprises: a handle which has an inner periphery provided with a female screw and which is rotatably supported by the casing; a movable body which has an outer periphery provided with a male screw and which is screwed into the inner periphery of the handle; and a guide means which prevents the movable body from rotating in relation to the casing and which allows the movable body to move vertically.

Further, it is more preferable that a movable body fixing means which blocks the movement of the movable body after the stem vertical movement amount is set.

The guide means is configured, for example, by a guide groove which is provided on the movable body and which extends vertically, and a guide pin which faces the guide groove from the radially outer side, but is not limited thereto. The movable body fixing means is obtained, for example, by using one or more setscrews, screwing the setscrew into a screw hole provided at the movable body, and causing a lower end of the setscrew to contact an upper face of the casing, but is not limited thereto.

The stem vertical-movement-amount fine-adjustment means may move vertically while the movable body rotates integrally with the handle by rotating the handle. The stem vertical-movement-amount fine-adjustment means is performed by converting rotation of the handle to vertical movement of the movable body whereby there is no possibility of the loosening of the screw portions or no possibility of the generation of the torsional stress applied to the bellows and the like. Therefore, reduction of accuracy caused by the loosening of the screw portion and reduction of the durability caused by the torsional stress are prevented.

In some cases, a handle consists of: an outer cylindrical body, which is a portion to be held by a hand; an inner cylindrical body which is fitted into the outer cylindrical body; and a shaft body which is fitted into the inner cylindrical body, a female screw is formed on an inner periphery of the casing, a male screw which is screwed into the female screw of the casing is formed on the inner cylindrical body, a male screw which has a pitch smaller than that of the female screw of the casing is formed on an outer periphery of the shaft body, and a female screw which is screwed to the male screw of the shaft body is formed on an inner periphery of the movable body.

With this configuration fine adjustment may be performed much more precisely.

Advantageous Effects of Invention

In accordance with the fluid controller of the present invention, since, by the stem vertical-movement-amount upper-limit-value setting means, the stem vertical movement amount is set to an upper limit value whereby the durability is ensured. A fine adjustment of the Cv value is performed by the stem vertical-movement-amount fine-adjustment means which changes the stem vertical movement amount within a range of not greater than an upper limit value. Therefore, while the durability is ensured, precise flow rate adjustment may be performed.

Figure 1:
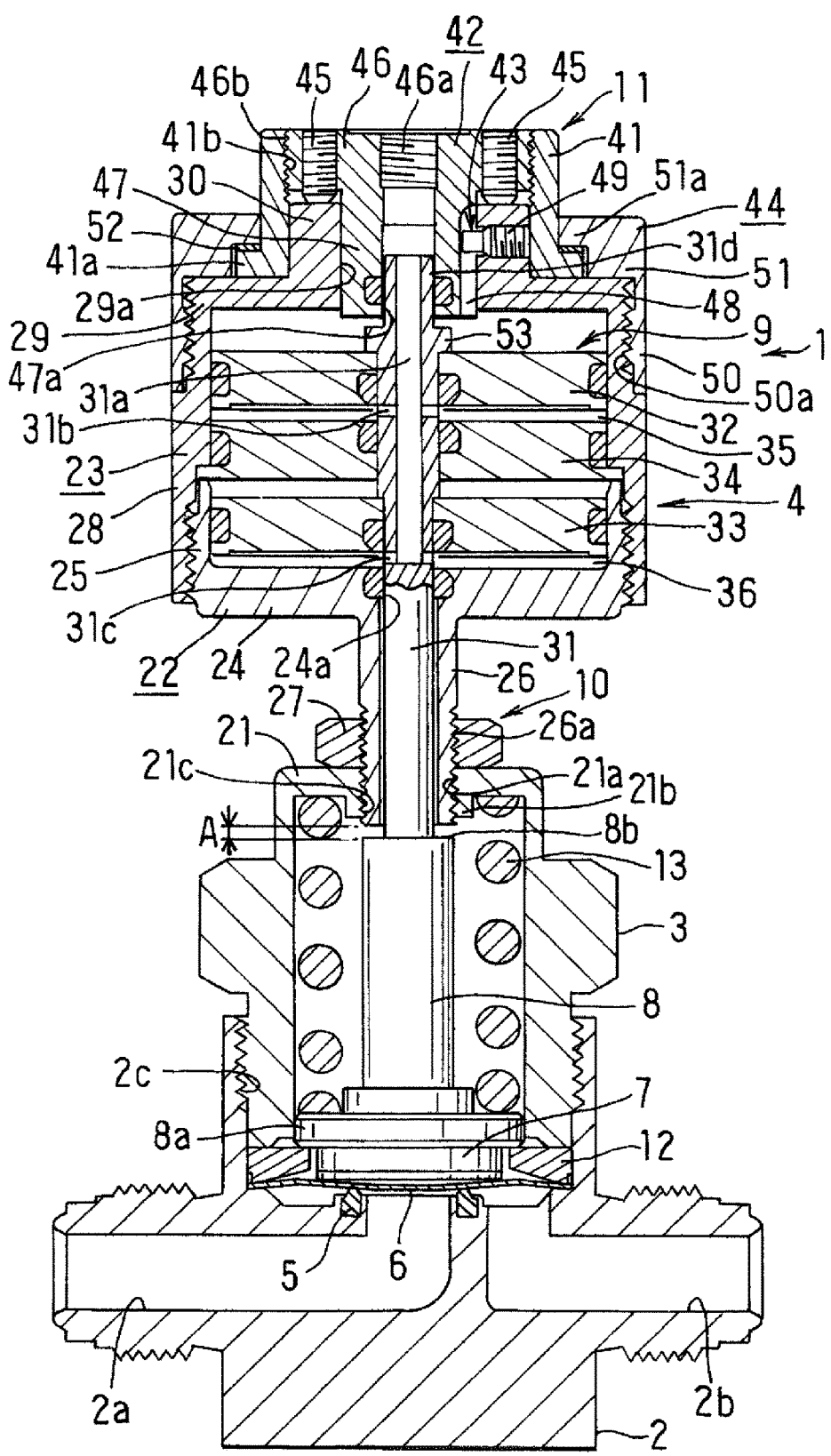
FIG. 1 is a vertical cross-sectional view of a fluid controller according to a first embodiment of the present invention.

REFERENCE SIGNS LIST (1): fluid controller, (2): body, (2a): fluid inflow channel, (2b): fluid outflow channel, (2c): depression, (3): bonnet, (4): casing, (6): diaphragm (valve body), (8): stem, (9): actuator, (10): vertical-movement-amount upper-limit-value setting means, (11): stem vertical-movement-amount fine-adjustment means, (31): drive shaft (actuator drive shaft), (31d): upper end portion, (41): handle, (41b): female screw, (42): movable body, (43): guide means, (46b): male screw, (61): stem vertical-movement-amount fine-adjustment means, (62): casing, (62a): female screw, (64): handle, (65): movable body, (66): guide means, (71): outer cylindrical body, (72): inner cylindrical body, (72a): female screw, (73): shaft body, (73a): male screw, (77a): female screw

DESCRIPTION OF EMBODIMENTS

Embodiments of the present invention will now be described with reference to the drawings. In the following description, the "upper" and "lower" sides in the drawings will be referred to as "upper" and "lower", respectively.

Figure 2:
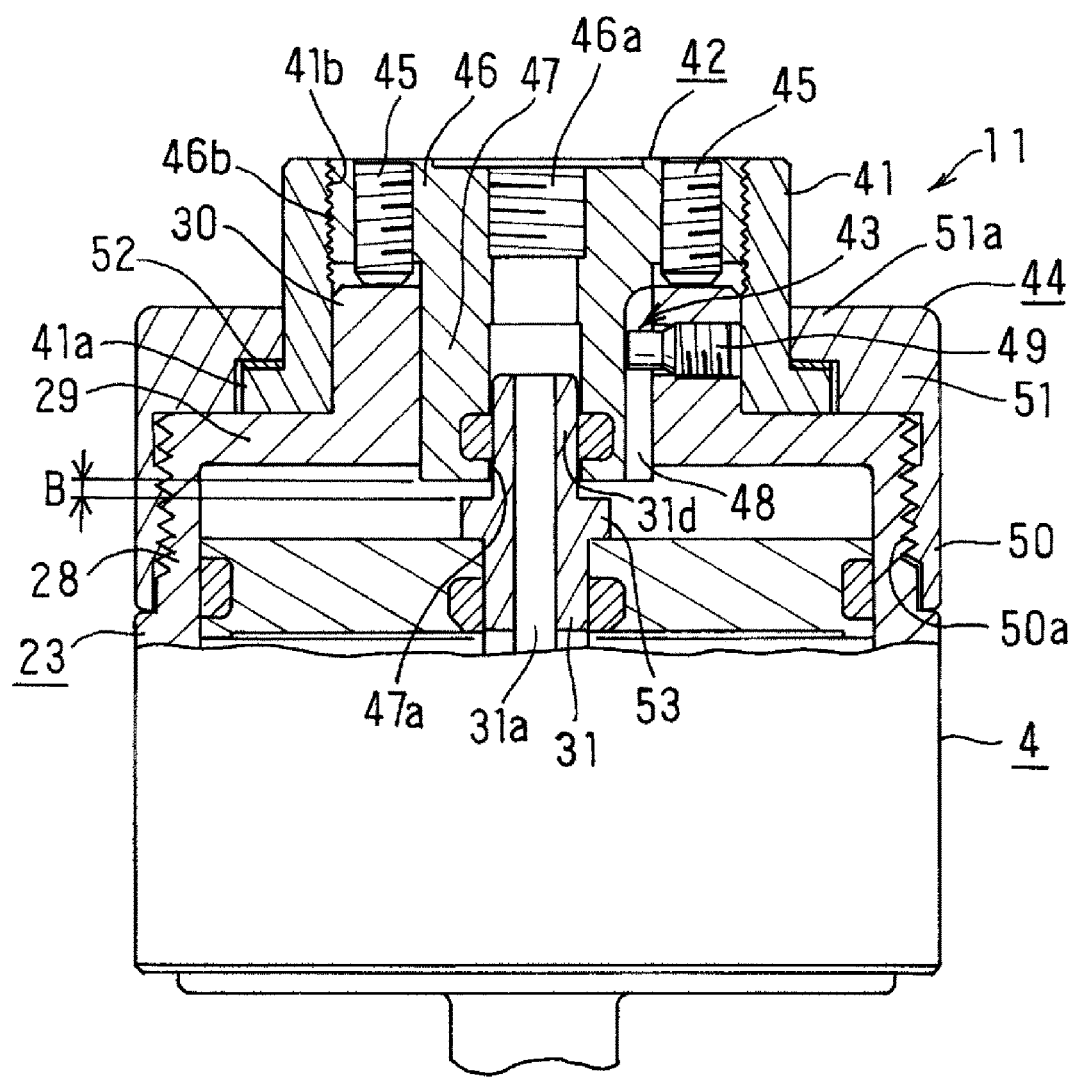
FIG. 2 is an enlarged vertical cross-sectional view of a stem vertical-movement-amount fine-adjustment means, which is an essential component of FIG. 1.
Figure 3:
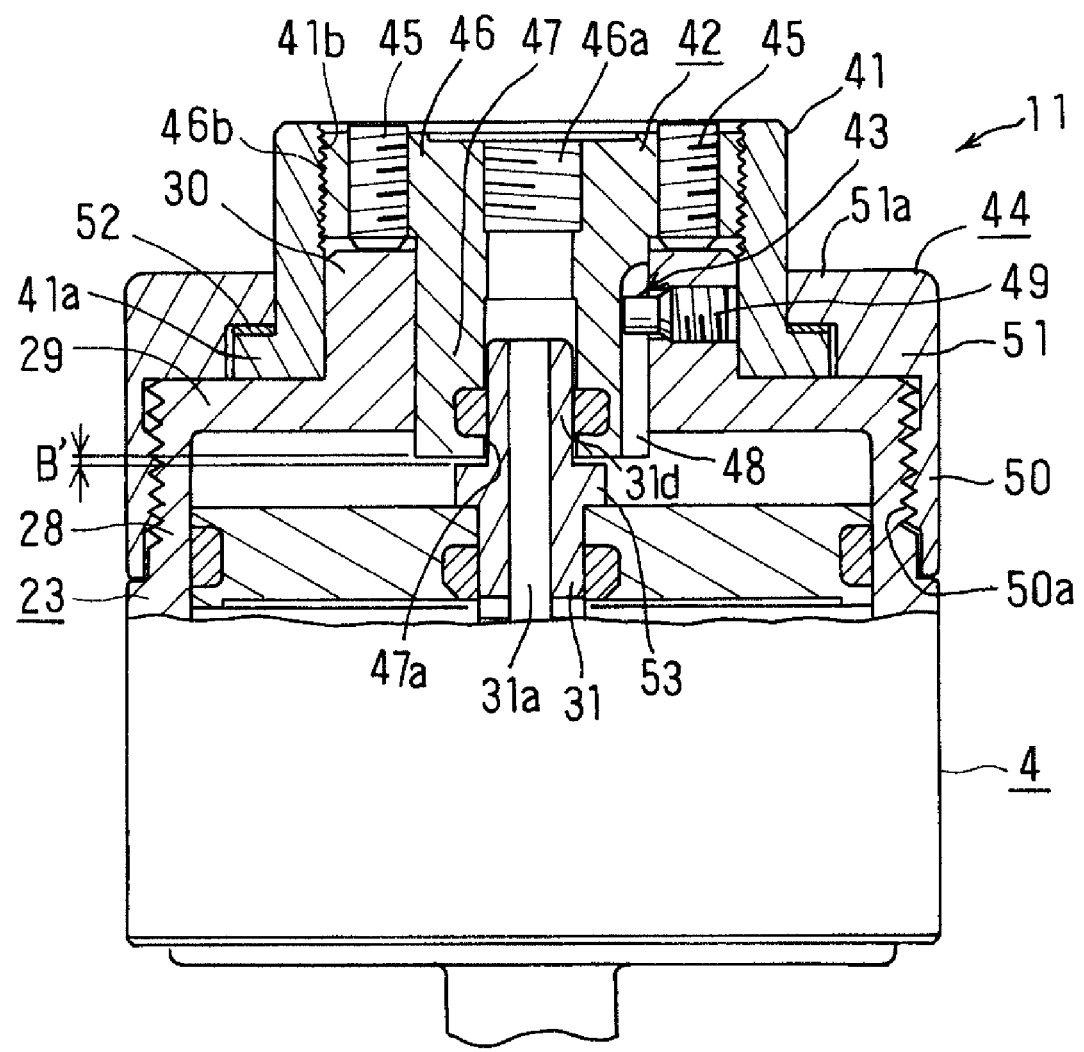
FIG. 3 is an enlarged vertical cross-sectional view showing a state in which a stem vertical movement amount is changed by the stem vertical-movement-amount fine-adjustment means from the state shown in FIG. 2.

FIG. 1 to FIG. 3 show a fluid controller according to a first embodiment of the present invention.

A fluid controller (1) is referred to as a direct touch-type metal diaphragm valve. As shown in FIG. 1, the fluid controller (1) provided with: a block-shaped body (2) having a fluid inflow channel (2a), a fluid outflow channel (2b), and a depression (2c) opening upward; a cylindrical bonnet (3) extending upward and having a lower end portion which is screwed into an upper portion of the depression (2c) of the body (2); a casing (4) provided above the bonnet (3); an annular synthetic resin seat (5) provided on a peripheral edge of the fluid inflow channel (2a); a metal diaphragm (valve body) (6) which is pressed against or separated from the seat (5) to close or open the fluid inflow channel (2a), respectively; a stem (8) which presses the diaphragm (6) against the seat (5) and separates the diaphragm (6) from the seat (5) via a diaphragm presser (7); an actuator (9) which is housed in the casing (4) and which causes the stem (8) to move vertically; a stem vertical-movement-amount upper-limit-value setting means (10) which sets an upper limit value of a stem vertical movement amount; and a stem vertical-movement-amount fine-adjustment means (11) which changes the stem vertical movement amount within a range of not greater than the upper limit value.

The bonnet (3) has a top wall (21) in which a through hole (21a) through which the stem (8) is inserted in a vertically movable manner is provided in a center portion of the top wall (21). At a peripheral edge portion of the through hole (21a), a cylindrical downward protruding edge portion (21b) which protrudes downward is provided. On the inner periphery of the through hole (21a) and the downward protruding edge portion (21b), a female screw (21c) is provided.

The casing (4) consists of a lower casing portion (22) and an upper casing portion (23) having a lower end portion which is screwed to the lower casing portion (22).

The lower casing portion (22) has: a bottom wall (24) in which a through hole (24a) through which the stem (8) is inserted in a vertically movable manner is provided in a center portion of the bottom wall (24); and a cylindrical surrounding wall (25). At a peripheral edge portion of the through hole (24a), a cylindrical downward protruding portion (26) which protrudes downward is provided. On an outer periphery of a lower portion of the downward protruding portion (26), a male screw portion (26a) is provided. To an upper portion of the male screw portion (26a), a lock nut (27) is screwed. A lower portion of the male screw portion (26a) is screwed into a female screw (21c) provided on the top wall (21) of the bonnet (3).

The upper casing portion (23) has a cylindrical surrounding wall (28) and a top wall (29). At the center portion of the top wall (29), a through hole (29a) is formed. At the peripheral edge portion of the through hole (29a), a cylindrical upward protruding portion (30) which protrudes upward is provided.

Between a lower end surface of the bonnet (3) and a bottom surface of the depression (2c) of the body (2), a pressing adapter (12) is placed. An outer peripheral edge portion of the diaphragm (6) is held between the pressing adapter (12) and the bottom surface of the depression (2c) of the body (2).

The diaphragm (6) has the shape of a spherical shell in a natural state, which has an arc shape curving upward. The diaphragm (6) is for example made of a nickel alloy thin sheet, is cut out into the shape of a circle, and is formed into a spherical shell having the center portion bulging upward. In some cases, the diaphragm (6) is made of a stainless steel thin sheet, and is made of a layered product formed of a stainless steel thin sheet and a nickel-cobalt alloy thin sheet.

A flange (8a) is provided near a lower end of the stem (8). Between the flange (8a) and an outer peripheral edge portion of the top wall (21) of the bonnet (3), a compression coil spring (biasing member) (13) which biases the stem (8) downward is placed. The compression coil spring (13) maintains the fluid controller (1) in a closed state in the normal condition (when the actuator (9) is not operated).

The actuator (9) has: a drive shaft (31) having a lower end portion which is screwed to an upper end portion of the stem (8) whereby the drive shaft (31) is fixed to the stem (8); slidable upper and lower pistons (32), (33) each having an outer peripheral surface which is in close contact with an inner peripheral surface of the casing (4) and each having an inner peripheral surface which is in close contact with an outer peripheral surface of the drive shaft (31); and a counter plate (34) positioned between the upper and lower pistons (32), (33).

Operational air introduction chambers (35), (36) are below the upper and lower pistons (32), (33), respectively. The drive shaft (31) is provided with an axial channel (31a) and radial channels (31b), (31c) for sending operational air into the operational air introduction chambers (35), (36).

The outer diameter of the stem (8) is larger than that of the drive shaft (31). An upper end surface (8b) of the stem (8) is protruding beyond the outer diameter of the drive shaft (31) radially outward. The dimensions (vertical length and the like) of the stem (8) is set in such a manner that stem vertical movement amount A may be provided between the upper end surface (8b) of the stem (8) and a lower surface of the downward protruding portion (26) of the lower casing portion (22).

When the stem (8) moves upward, the upper end surface (8b) of the stem (8) contacts the lower surface of the downward protruding portion (26) of the lower casing portion (22), whereby the further movement of the stem (8) upward is blocked. In the state where the lock nut (27) is loosen, the lower casing portion (22) is rotated, whereby stem vertical movement amount A, that is, an upper limit value of an upward movement amount of the stem (8) may be set to a required value. The downward protruding portion (26) of the casing where the male screw portion (26a) is provided, the female screw (21c) provided on the top wall (21) of the bonnet (3), and the lock nut (27) constitute the stem vertical-movement-amount upper-limit-value setting means (10) which sets the upper limit value of stem vertical movement amount A.

As the upper limit value of stem vertical movement amount A, a value with which a required durability may be secured is set. Here, stem vertical movement amount A has a correlation to a flow rate (Cv value). Therefore, in order to obtain a desired Cv value, changing stem vertical movement amount A is necessary. By changing stem vertical movement amount A obtained by the stem vertical-movement-amount upper-limit-value setting means (10), the Cv value may be adjusted. In this case, the durability also changes. Therefore, in order to enable the change of the stem vertical movement amount for obtaining the desired Cv value without changing stem vertical movement amount A obtained by the stem vertical-movement-amount upper-limit-value setting means (10), the stem vertical-movement-amount fine-adjustment means (11) is used.

As also shown in FIG. 2 and FIG. 3, the stem vertical-movement-amount fine-adjustment means (11) is provided with: a cylindrical handle (41); a cylindrical movable body (42) which is moved vertically in association with rotation of the handle (41); a guide means (43) which prevents the movable body (42) from rotating in relation to the casing (4) and which enables the movable body (42) to move vertically; a handle pressing ring (44) which causes the casing (4) to support the handle (41) rotatably; and two setscrews (45) (movable body fixing means) which block the movement of the movable body (42) after the stem vertical movement amount is set.

The handle (41) has a flange portion (41a) at the lower end portion. The handle (41) is provided on an inner periphery of an upper portion thereof with a female screw portion (41b). The handle (41) has a lower portion which is fitted to an outer periphery of an upward protruding portion

(30) of the upper casing portion (23) with a slight gap interposed therebetween. The handle (41) has a lower end which is received on an upper surface of the top wall (29) of the upper casing portion (23).

The movable body (42) consists of an upper large-diameter portion (46) and a lower small-diameter portion (47) having the same inner diameter as that of the large-diameter portion (46) and having a smaller outer diameter than that of the large-diameter portion (46). A lower surface of the large-diameter portion (46) is received on an upper surface of the upward protruding portion (30) of the upper casing portion (23).

On the inner periphery of the large-diameter portion (46), a pipe connection portion (46a) for introducing operational air is provided. On the outer periphery of the large-diameter portion (46), a male screw portion (46b) which is screwed into the female screw portion (41b) of the handle (41) is formed. The large-diameter portion (46) is provided with two screw holes which penetrate therethrough vertically. Into each screw holes, a setscrew (45) as a movable body fixing means is screwed.

On an inner periphery of the small-diameter portion (47), a through hole (47a) into which an upper end portion (31d) of the drive shaft (31) is inserted is provided so as to be contiguous to the pipe connection portion (46a). On an outer periphery of the small-diameter portion (47), a guide groove (48) extending vertically is provided.

On the upward protruding portion (30) of the upper casing portion (23), a guide pin (49) having an axis which extends in a direction perpendicular to the vertical direction is provided so as to face the guide groove (48) from the radially outer side. On an outer periphery of the guide pin (49) except for a distal end portion thereof, a male screw is provided. The male screw is screwed into a screw hole provided in the upward protruding portion (30) of the upper casing portion (23) whereby the guide pin (49) is fixed to the upper casing portion (23).

The distal end portion of the guide pin (49) is fitted into the guide groove (48) whereby the movable body (42) is not capable of rotating in relation to the upper casing portion (23) and is capable of moving vertically in relation to the upper casing portion (23). As described above, the guide groove (48) and the guide pin (49) constitute the guide means (44) which prevents the movable body (42) from rotating in relation to the casing (4) and which enables the movable body (42) to move vertically.

The handle pressing ring (44) consist of a lower thin portion (50) and an upper thick portion (51) having an outer diameter which is the same as that of the thin portion (50) and having an inner diameter which is smaller than that of the thin portion (50). On the inner periphery of the thin portion (50), a female screw (50a) is provided. At an upper end portion of the thick portion (51), an annular projecting edge portion (51a) which projects radially inward is provided. The handle pressing ring (44) is screwed to the surrounding wall (28) of the upper casing portion (23). A lower surface of the thick portion (51) is received on the upper surface of the top wall (29) of the upper casing portion (23).

The annular projecting edge portion (51a) of the thick portion (51) is received on an upper surface of the flange portion (41a) of the handle (41) via a washer (friction reducing member) (52) coated with a fluororesin (for example, Teflon (registered trademark)). The fluororesin-coated washer (52) has a small frictional coefficient, and therefore is easy to rotate the handle (41).

In an open state (a state of being pressurized with operational air) of the fluid controller (1), it becomes harder to perform an operation of the handle (41). But, by the provision of the fluororesin coating washer (52), operability in the open state is improved. Materials for the fluororesin coating may be resins such a PPS and the like. Alternatively, the washer may be made of metal (SUS, aluminum, iron, and the like). In addition, a friction reducing member such as a thrust bearing may be used instead of using the washer (52). Further, a structure in which frictional coefficient is reduced may be obtained by using a ball bearing and the like.

In a state shown in FIG. 1 and FIG. 2, into each screw hole of the large-diameter portion (46) of the movable body (42), a setscrew (45) is screwed. Each setscrew (45) has a lower end which is in contact with the upper surface of the upward protruding portion (30) of the upper casing portion (23).

Therefore, the vertical movement of the movable body (42) is blocked. By loosening each setscrew (45), the movable body (42) becomes capable of moving vertically.

In the state where the upper end portion (31d) of the drive shaft (31) is inserted into the through hole (47a) provided on the inner periphery of the small-diameter portion (47) of the movable body (42), a flange portion (53) is provided in the vicinity of the upper end portion (31d) of the drive shaft (31), that is, at a portion of the drive shaft (31) which is positioned below the through hole (47a). With this configuration, between an upper surface of the flange portion (53) of the drive shaft (31) and a lower surface of the small-diameter portion (47) of the movable body (42), a stem vertical movement amount shown by "B" in FIG. 2 (a stem vertical movement amount which is set at a different value and at a location different from that shown by "A" in FIG. 1) is set.

When the stem (8) moves upward, the upper surface of the flange portion (53) of the drive shaft (31) comes into contact with the lower surface of the small-diameter portion (47) of the movable body (42) whereby the further movement of the stem (8) upward is blocked. In the state of loosening the two setscrews (45), the handle (41) is rotated, whereby the stem vertical movement amount (the upper limit value of the upward movement amount of the stem (8)) may be set to desired value B' (smaller value as compared with the case as shown in FIG. 2, for example) as shown in FIG. 3.

Here, the magnitudes of stem vertical movement amounts B and B' are set to a magnitude not greater than stem vertical movement amount A. In the setting, first, at the time of shipment of the fluid controller (1) or at the time when the fluid controller (1) is used, stem vertical movement amount A is set to a maximum value at which the durability of the valve may be secured at a high durability level, regardless of the working condition and the required flow rate. Then, stem vertical movement amount B or B' is set in consideration of the working condition and the required flow rate.

A user of the fluid controller (1) needs to adjust the stem vertical movement amount for the purpose of matching the Cv value for each gas line used. At this time, stem vertical movement amount A is not changed, and stem vertical movement amount B or B' is to be finely adjusted. By this, accurate adjustment of the Cv value may be performed in the state where the durability does not decrease beyond the set value. Pitches of the male screw (46b) of the movable body (42) and the female screw (41b) of the handle (41) are 0.5-0.75, for example, for facilitating the fine adjustment.

As described above, because fine adjustment of stem vertical movement amount B or B' by the stem vertical-movement-amount fine-adjustment means (11) is performed by converting the rotation of the handle (41) into the vertical movement of the movable body (42), there is no possibility of the loosening of the screw portions or no possibility of the generation of the torsional stress applied to the bellows and the like, as compared with the case of adjusting the stem vertical movement amount by the rotation of the movable body. As a result, reduction of the accuracy, which is caused by the loosening of the screw portion, and reduction of the durability, which is caused by the torsional stress are prevented.

Figure 4:
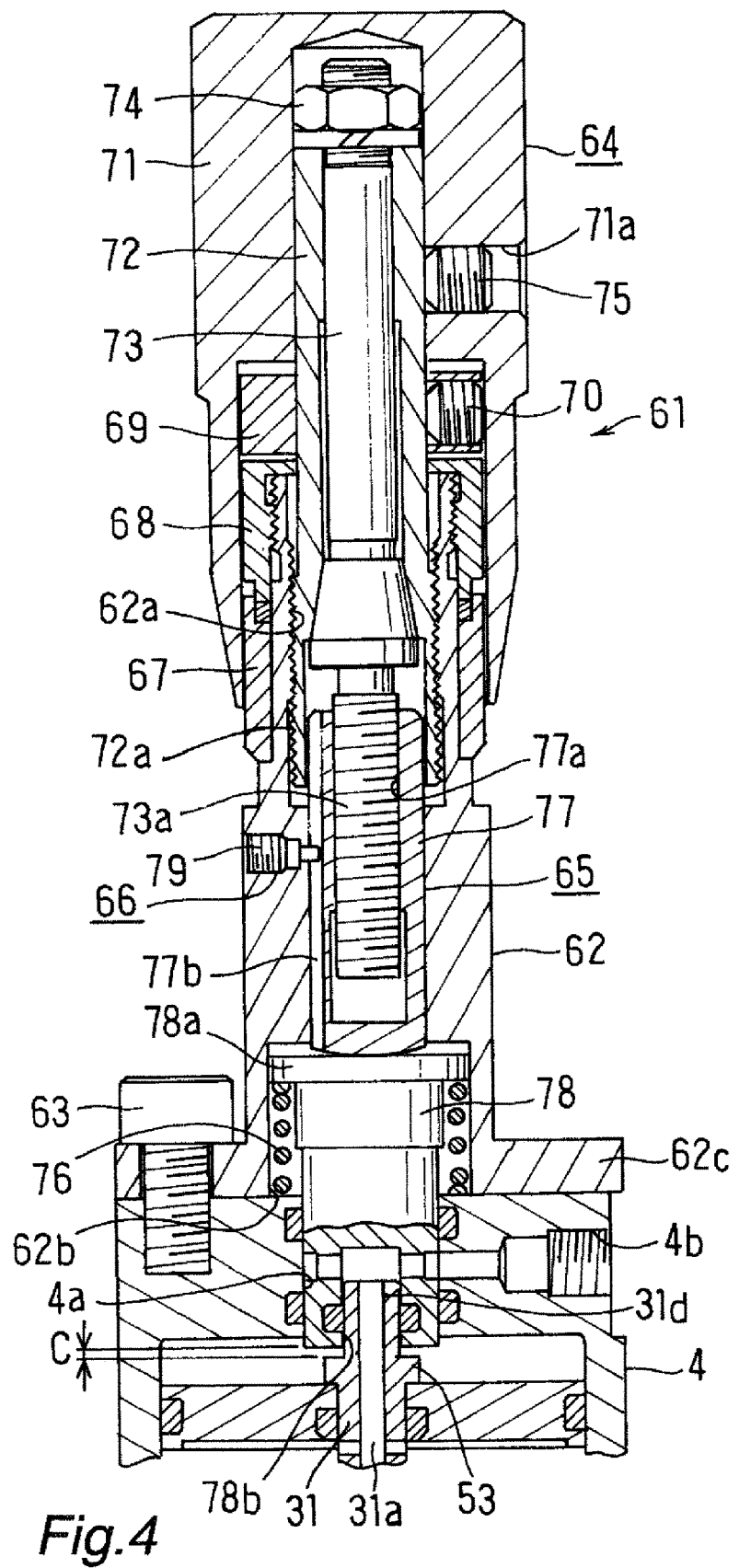
FIG. 4 is an enlarged vertical cross-sectional view of a stem vertical-movement-amount fine-adjustment means, which is an essential component of a fluid controller according to a second embodiment of the present invention

The stem vertical-movement-amount upper-limit-value setting means (10) and the stem vertical-movement-amount fine-adjustment means (11) are not limited to those described above. As such an example, FIG. 4 shows a stem vertical-movement-amount fine-adjustment means according to the second embodiment.

This stem vertical-movement-amount fine-adjustment means (61) includes: a cylindrical adjustment-means-housing casing (hereinafter, simply referred to as "casing") (62), which is fixed to a top portion of an actuator-housing casing (4); a cylindrical handle (64) which is supported rotatably by the casing (62); a movable body (65) which is moved vertically in association with rotation of the handle (64); and a guide means (66) which prevents the movable body (65) from rotating in relation to the casing (62) and which enables the movable body (65) to move vertically.

The casing (62) has a flange (62c) which contacts the top portion of the actuator-housing casing (4). Part of the flange (62c) is fixed to the actuator-housing casing (4) by a plurality of (for example, three) screws (63).

The handle (64) consists of: an outer cylindrical body (71), which is a portion to be held by a hand; an inner cylindrical body (72) which is fitted into the outer cylindrical body (71) from the lower side; and a shaft body (73) which is fitted into the inner cylindrical body (72) from the lower side.

The shaft body (73) is inserted through the inner cylindrical body (72) in such a manner that the upper end portion of the shaft body (73) protrudes upward. A nut (74) screwed to an upper end portion of the shaft body (73) is fastened whereby the shaft body (71) and the inner cylindrical body (72) are coupled. In addition, the outer cylindrical body (71) and the inner cylindrical body (72) are coupled by a setscrew (75) screwed into a screw hole (71a) which is provided at the outer cylindrical body (71) and which penetrates radially. With this configuration, by rotating the outer cylindrical body (71) of the handle (64), the inner cylindrical body (72) and the shaft body (73) also rotates integrally.

A space is provided between an upper portion of the casing (62) and a lower portion of the outer cylindrical body (71). In this space, a cylindrical indicator (67) is fitted to an outer peripheral surface of the upper portion of the casing (62). The indicator (67) is prevented from coming off by a cap nut (68) screwed to the upper portion of the casing (62).

Furthermore, in the space, at a portion above the cap nut (68) inside the outer cylindrical body (71), an annular stopper (69) is provided. The stopper (69) is fitted on an outer periphery of the inner cylindrical body (72) so as to be movable vertically, is positioned at a vertically predetermined position, and is fixed to the inner cylindrical body (72) by the setscrew (70). The stopper (69) contacts an upper surface of the cap nut (68) when the handle (64) descends whereby descent of the handle (64) at the time of the fully closed state of the fluid controller (1) is regulated.

A male screw (72a) is formed on an outer periphery of the lower portion of the inner cylindrical body (72). A male screw (73a) is formed on an outer periphery of the lower portion of the shaft body (73). A female screw (62a) which corresponds to the male screw (72a) of the inner cylindrical body (72) is formed on an inner periphery of the upper portion of the casing (62). The casing (62) and the inner cylindrical body (72) are screwed together so as to be rotatable relatively.

The movable body (65) consists of: a screw member (77) having a female screw (77a); and a spring receiving member (78) which receives a compression coil spring (biasing member) (76). The screw member (77) and the spring receiving member (78) are separate members.

The screw member (77) of the movable body (65) has a bottomed cylindrical shape, and has, on an inner periphery of the screw member (77), the female screw (77a) which is screwed to the male screw (73a) of the shaft body (73) of the handle (64). The screw member (77) is screwed to the male screw (73a) of the shaft body (73) in a state where an upper end portion of the screw member (77) is inserted into a lower end portion of the inner cylindrical body (72).

The screw pitch gauge for the male screw (73a) of the shaft body (73) of the handle (64) and the female screw (77a) of the screw member (77) of the movable body (65) (first screwing-together) is smaller than that for the female screw (62a) of the casing (62) and the male screw (72a) of the inner cylindrical body (72) (second screwing-together). The orientation of the screw for the first and second screwing together is set such that the movable body (65) descends when the handle (64) is rotated to descend.

The spring receiving member (78) is inserted into a depression (62b) which is provided at a lower end portion of the casing (62) and which opens downward so as to be movable vertically. A lower portion of the spring receiving member (78) is positioned below a lower surface of the flange (62c) of the casing (62), and is inserted into a through hole (4a) provided at a top wall of the actuator-housing casing (4). The compression coil spring (76) is placed between a flange portion (78a) provided at an upper end portion of the spring receiving member (78) and an upper surface of the top wall of the actuator-housing casing (4), and biases the spring receiving member (78) upward. When the screw member (77) descends, the spring receiving member (78), being pressed by the screw member (77), descends integrally with the screw member (77). When the screw member (77) ascends, the spring receiving member (78), due to an elastic force of the compression coil spring (76), ascends integrally with the screw member (77).

The spring receiving member (78) is provided with a shaft insertion hole (78b) into which an upper end portion (31d) of the drive shaft (31) is inserted. The drive shaft (31) has the same shape as that of the first embodiment. Between an upper surface of the flange portion (53) of the drive shaft (31) and a lower surface of the spring receiving member (78) of the movable body (65), stem vertical movement amount C corresponding to the stem vertical movement amount indicated by "B" in FIG. 2 is set. The screw member (77) and the spring receiving member (78) (that is, the movable body (65)) descend whereby stem vertical movement amount C is decreased, whereas the screw member (77) and the spring receiving member (78) (that is, the movable body (65)) ascend whereby vertical movement amount C is increased.

The actuator-housing casing (4) is provided with a pipe connection portion (4b), and an axial channel (31a) of the drive shaft (31) communicates with the pipe connection portion (4b).

On an outer periphery of the screw member (77), a guide groove (77b) which extends vertically is provided. In the casing (62), a guide pin (79) having an axis extending in the direction perpendicular to the vertical direction is provided so as to face the guide groove (77b) from the radially outer side. On an outer periphery of the guide pin (79) except for a distal end portion thereof, a male screw is provided. The male screw is screwed into a screw hole provided in the casing (62) whereby the guide pin (79) is fixed to the casing (62). The distal end portion of the guide pin (79) is fitted into the guide groove (77b) whereby the screw member (77) of the movable body (65) is not capable of rotating in relation to the casing (62) and is capable of moving vertically in relation to the casing (62). As described above, the guide groove (77b) and the guide pin (79) constitute the guide means (66) which prevents the screw member (77) of the movable body (65) from rotating in relation to the casing (62) and which enables the screw member (77) of the movable body (65) to move vertically.

According to the stem vertical-movement-amount fine-adjustment means (61) of the second embodiment, the outer cylindrical body (71) of the handle (64) is rotated in a direction for descending, whereby the inner cylindrical body (72) and the shaft body (73), integrally with the outer cylindrical body (71), descend while rotating. The screw member (77) of the movable body (65) which is screwed to the shaft body (73) descends in a state where rotation of the screw member (77) is blocked by the guide means (66). At this time, the screw pitch gauge for the first screwing-together (screwing-together of the male screw (73a) of the shaft body (73) of the handle (64) and the female screw (77a) of the screw member (77) of the movable body (65)) is smaller than that for the second screwing-together (screwing-together of the female screw (62a) of the casing (62) and the male screw (72a) of the inner cylindrical body (72)), whereby the screw member (77) of the movable body (65) descends by an amount of the difference in the screw pitch gauge. Therefore, as compared with the first embodiment, it becomes possible to perform a fine adjustment in a much more precise manner.

In the above, an air driven direct touch-type metal diaphragm valve is described as an example of the fluid controller (1). However, the above-described stem vertical-movement-amount upper-limit-value setting means (10) and the stem vertical-movement-amount fine-adjustment means (11) are not limited to be applied thereto but may be applied to various valves and the like which need adjustment of the stem vertical movement amount.

Furthermore, in the above, the stem vertical-movement-amount upper-limit-value setting means (10) is set according to the length between the stem (8) and the downward protruding portion (26) of the lower casing portion (22) and the stem vertical-movement-amount fine-adjustment means (11) is adjusted with the handle (41). However, this operation may be performed in a reverse manner.

INDUSTRIAL APPLICABILITY

In accordance with the present invention, in the fluid controller which is suitable to be used for continuously repeating opening and closing operations, flow rate adjustment may be performed in a precise manner, which contributes to improvement of the performance of the fluid controller.

The invention claimed is:
1. A fluid controller including:
a body provided with a fluid channel;
a bonnet provided above the body;
a casing provided above the bonnet;
a valve body which opens and closes the fluid channel;
a stem which moves upward or downward to move the valve body in an open or close direction; and
an actuator which causes the stem to move vertically, wherein
an upper limit value of a vertical movement amount of the stem associated with the opening and closing of the fluid channel is set at a target value, the vertical movement amount of the stem associated with the opening and closing of the fluid channel is adjusted within a range of not greater than the target value,
a stem vertical-movement-amount fine-adjustment means comprises:
a handle which has an inner periphery provided with a female screw and which is rotatably supported by the casing; and
a movable body which has an outer periphery provided with a male screw and which is screwed into the inner periphery of the handle, and
the movable body is prevented from rotating in relation to the casing and the movable body is allowed to move vertically.
2. The fluid controller according to claim 1, wherein
an upper end portion of the actuator drive shaft which is integral with the stem is inserted into a shaft insertion hole of a movable body,
a flange portion is provided on a part of the actuator drive shaft located below the shaft insertion hole, and
a distance between an upper surface of the flange portion of the actuator drive shaft and a lower surface of the movable body defines the stem vertical movement amount.
3. The fluid controller according to claim 1, wherein
a handle consists of: an outer cylindrical body, which is a portion to be held by a hand; an inner cylindrical body which is fitted into the outer cylindrical body; and a shaft body which is fitted into the inner cylindrical body,
a female screw is formed on an inner periphery of the casing,
a male screw which is screwed into the female screw of the casing is formed on the inner cylindrical body,
a male screw which has a pitch smaller than that of the female screw of the casing is formed on an outer periphery of the shaft body, and
a female screw which is screwed to the male screw of the shaft body is formed on an inner periphery of a movable body.

* * * * *